2,785,153
SILVER PROTEIN

Arthur P. Locke, Stoystown, Pa., and Frederick Messer, New Brunswick, N. J., assignors to Crookes-Barnes Laboratories, Inc., a corporation of Delaware No Drawing. Application September 13, 1954, Serial No. 455,742

8 Claims. (Cl. 260—114)

This invention relates to silver protein for therapeutic uses and has for its object improvements in the method of producing such silver protein and in the silver protein itself as a pharmaceutical product.

It is customary to produce silver protein of various strengths—mild and strong—by interacting silver nitrate, sodium hydroxide and protein; to obtain so-called "crystals" or "crystal-like plates" of the silver protein by evaporating most of the water from the resulting mixture; and to distribute the "crystals" to the drug trade. When requested to dispense the same, a pharmacist dissolves a given amount of the "crystals" in a given amount of water to provide a fresh silver protein solution of given concentration.

The most common silver protein is the "mild." Old solutions of mild silver protein, even when visibly deteriorated, usually are no less effective bacteriostatically than fresh solutions, and may even have become more strongly bacteriostatic; a change in the direction of strong silver protein, at the expense of the product's mildness. The mildness of mild silver protein, N. F. (National Formulary), and its differentiation from strong silver protein, N. F., are in part a function of silver ion concentration in a solution of the same. Despite the fact that mild silver protein has a higher total silver content than strong silver protein, it releases that silver to solution at a lower silver ion level. The lower the silver ion level, the greater the mildness, but there is a limit to the lowness to which that level can be reduced without loss of bacteriostatic effectiveness.

The height of the silver ion level maintained is affected both by the method of producing the silver protein and the composition of the product itself. The silver protein aggregates of the mild silver protein herewith described contain, on drying to a moisture content of approximately 4 percent, approximately 20 percent of silver (estimated as elementary silver), so processed during manufacture as to yield on solution in water, to a mild silver protein concentration of 10 percent, a total silver concentration of 2 percent and an ionic silver concentration between $10^{-6}$ and $10^{-8}$ molar. This range of silver ion concentration combines mildness of such high degree that no reddening or other evidence of irritation is seen following instillation into the sensitive eyes of a rabbit, together with a degree of bacteriostatic effectiveness capable of checking the growth of representative bacteria and fungi even after dilution many times beyond the strengths normally used for cleansing or therapeutic purpose in eye, nose, throat or genito-urinary tract.

Solutions of mild silver protein are colloidal in type. They are a colloidal complex of protein and silver. Only the minute fraction of the total silver which is ionic passes through a dialysing membrane.

Colloids as a class are inherently unstable; they are sensitive to acid-base shifts, and to salt and other changes in the fluids in which they are suspended. They are sensitive also to aging and to other special influences related to their chemical nature. This is true of silver protein. It has been found necessary to protect mild silver protein against adverse salt effects, through use of distilled water in making a solution; against such acidifying effects as follow absorption of carbon dioxide from the air, by providing a tightly closing dropper-and-cap assembly; against sunlight effects, by packaging in amber bottles, etc.

Provision against deterioration of the silver protein as a result of aging has been attained, heretofore, mainly through limitation to use of freshly prepared solutions. The description in N. F. has contained the caution: "Solutions of mild silver protein should be freshly prepared . . ." The manufacturer, although he prepares mild silver protein by processes carried on in aqueous solution, is able to implement freshness to the product reaching the user only by the costly device of evaporating the solution to a stable, dry or "crystal" product; this being supplied to the pharmacist who, in turn, brings the "crystals" back into solution prior to dispensing.

As a result of our investigations, we have discovered that silver protein may be produced in such a way as substantially to overcome disadvantages of the kind enumerated. It remains stable in solution and bacteriostatically effective over storage periods of many months.

We have found that the stability of the silver protein may be enhanced by the inclusion of a small but effective amount of a complexing, such as a chelating, agent at an appropriate stage in its production.

These and other features of the invention may be better understood by a consideration of the following examples of a practice of the invention.

67 pounds of protein in the form of gelatin are stirred into a body of warmed water until dissolved. A water solution of 11.9 pounds of sodium hydroxide is stirred into the gelatin solution; and cold water is added thereto in amount to prevent an undue rise in temperature. After completion of the reaction, in which sodium gelatinate is formed, the mixture is cooled further by stirring in some more cold water, after which it is filter-pressed to remove undissolved material. A water solution of 34.2 pounds of silver nitrate is then stirred into the sodium gelatinate filtrate until no lumps or related undissolved particles remain. The resulting silver protein is warmed, stirred and tested until its silver ion concentration falls to a level just above $10^{-5}$ molar; after which the mixture is cooled to room temperature and filter-pressed. Some further change in silver ion concentration occurs spontaneously, leveling off in the range $10^{-6}$ to $10^{-8}$ molar. On the basis of a sample tested for percent total solids, silver content and volume of filtrate obtained, the extent of required further dilution is calculated and enough water is added to yield a finished solution containing about 10 percent total silver protein solids. The final product is tested for its silver content, ionic silver level and general conformity to N. F. specifications for mild silver protein.

The stability of the silver protein may be appreciably enhanced by the addition of a suitable and effective amount of a complexing, such as a chelating, agent. To this end, enough of a 25 percent solution of monocalcium disodium ethylene diamine tetraacetate is added to bring the concentration of this chemical, on final dilution of the batch, to 1 percent. This is added preferably before the dilution step, in which case enough water is added to the solution of monocalcium disodium ethylene diamine tetraacetate to yield a final volume (about 120 gallons) containing a total solids content of about 10.5%. The final product is tested for its silver content, ionic silver level and general conformity to N. F. specifications for mild silver protein. In addition, however, the stability of this final solution is appreciably improved.

The protein selected should be one with qualities contributing to stable solution. Experience has indicated gelatin, a derived protein, obtained by the partial hydrolysis of collagen, to be the best practical choice, but only gelatin of a high grade of purity, such as required for photographic film should be used. To this end it is customary to purify the collagen by washing and other practical treatments physically to remove dirt and the like. Failure to purify the collagen, as much as is practically possible, before the conversion to gelatin, can contribute to instability in the finished silver protein solution.

The sodium hydroxide should be of high purity, U. S. P. or equivalent, so as not to introduce impurities which would deleteriously affect the stability of the final product.

The silver nitrate should be chemically pure, C. P. It is placed in solution advantageously by pouring boiling water onto crystals of the silver nitrate.

The monocalcium disodium salt of ethylene diamine tetraacetic acid is the chelating agent of choice at present, and the concentration of choice is the approximate minimum observed to have a lowering effect on the silver ion level, which may be seen from Table II below to be near 10 mg. per ml.

Ethylene diamine tetraacetic acid (EDTA) has a much less powerful chelating action toward silver than, for example, toward iron, copper or lead. The further depression of the ionic silver level accomplished by the addition of EDTA to a 10% solution of mild silver protein, in the amounts described in Tables I and II, is not a result of higher affinity between the EDTA and the silver than obtains between the protein and the silver but of the very high leverage, in a mass action way, brought to bear by the proportionately large quantities of EDTA added on the minute silver ion levels involved. It is quite possible that EDTA is capable of exerting a further stabilizing effect on the protein of mild silver protein, apart from its silver content but extending the capacity of that protein to hold the silver ion level within the mildness range. Such action could be exerted through suppression of ions, other than silver, involved in the implementation of spontaneous or enzyme motivated hydrolytic breakdown of the protein, on long storage, to units less capable of controlling silver ion level. Silver is, of course, both a powerful bacteriostat and a suppressant of bacterial enzymes, rendering unlikely any substantial extent of breakdown as a result of contaminant bacteria or bacterial enzyme action.

Among the chelating agents employed is tetrasodium ethylene diamine tetraacetate, as shown in Table I below. Such agents are described, for example, in a booklet entitled "The Versenes" issued by Bersworth Chemical Co., Framingham, Massachusetts, U. S. A.

The stability-enhancing agent may be added at any desired stage in the production of the silver protein. It can be added to the "crystals," by the manufacturer or even by the pharmacist, although that is not nearly as desirable as in the actual production operation, when the agent can be incorporated in a solution stage of the product. The agent could be added to the gelatin, or to the sodium gelatinate; but that would not be economical. There would be some loss during filtration, and that is avoidable by making the addition as a last step in the production operation. The addition of the agent to the sodium hydroxide or silver nitrate is objectionable for the same reason, and may be inadvisable for chemical reasons as well. Filtration losses are avoided when proceeding as described above.

Tables I and II below indicate (1) a progressive lowering of the silver ion level with progressive increase of the amount of the chelating agent added, and (2) a progressively lessened tendency of the silver ion level to rise, during long storage, with progressive increase in amount of chelating agent added, sufficient to hold the ionic silver level within the range herewith specified for mild silver protein solution during storage for more than one year.

Effect of quantity of added tetrasodium salt of ethylene diamine tetraacetic acid on the silver ion concentration of a 10 percent mild silver protein solution, immediately after the addition and following storage at room temperature for the indicated number of days:

Table I

| Amount of chelating agent added, mg. per ml. of 10% mild silver protein solution | Silver ion concentration, molar×10⁻⁶, following storage of the solution for— | | | | |
|---|---|---|---|---|---|
| | 0 days | 35 days | 98 days | 427 days | 594 days |
| 20 | .003 | .05 | .04 | | 0.080 |
| 40 | .002 | .025 | .013 | 0.025 | 0.032 |
| 75 | .001 | .016 | .008 | 0.008 | 0.001 |

Effect of quantity of added calcium disodium salt of ethylene diamine tetraacetic acid on the silver ion concentration of a 10 percent solution of mild silver protein, immediately after the addition and following storage at room temperature for the indicated number of days:

Table II

| Amount of chelating agent added, mg. per ml. of 10% mild silver protein solution | Silver ion concentration, molar×10⁻⁶, following storage of the solution for— | | | |
|---|---|---|---|---|
| | 0 days | 31 days | 266 days | 433 days |
| 6 | .016 | .20 | .60 | 0.50 |
| 12 | .016 | .10 | .16 | 0.25 |
| 19 | .013 | .06 | .16 | 0.25 |
| 38 | .010 | .03 | .32 | 0.40 |

Tables I and II show, in addition to an initial depressive effect on the silver ion level, by the concentrations of EDTA compared, a decreased rate of rise in silver ion concentration, on storage, proportionate to the amount of EDTA added. All things considered, it appears best to determine the minimum amount of EDTA necessary to exert the desired stabilizing effect. An increase in the amount of EDTA to levels above the 40 mg. (Table I), namely to 75 mg., produces only a slightly greater effect on the silver ion level than is obtainable with 40 mg. Similarly, an increase in the amount of EDTA to levels above the 12 mg. (Table II), namely to 19 and 38 mg., produces only a very slightly greater effect on the silver ion level than is obtainable with 12 mg. The transition between apparent non-effect and the beginning of positive-effect by the added monocalcium disodium EDTA (Table II) on the initial silver ion level can be seen to be between 12 and 19 mg. per ml. The stabilizing effect appears to begin between 6 and 12 mg./ml., roughly near 10 mg./ml. From this it can be concluded that that is about the minimum amount of mg./ml. of EDTA that should be added to 10 percent mild silver protein. Solutions of 10 percent mild silver protein to which 1 percent of monocalcium disodium EDTA has been added appear to survive long storage without a large increase in its free silver ion level, and without associated undesirable change in appearance, bacteriostatic power, or tendency to develop irritation upon instillation in the eyes of rabbits.

An estimate of the relative amounts of silver, in a 10 percent solution of mild silver protein containing 1 percent (10 mg. per ml.) of added monocalcium disodium EDTA, which are combined with the protein, with the EDTA, and in free, ionic form, indicates that the total silver content is near 20 mg./ml.; and that the free ionic silver concentration is between 0.000,001 and 0.000,1 mg./ml.

Tests of the effect on the silver ion concentration as a result of dilution of the mild silver protein show a reservoir effect, with loosening of further ions from the complex in counteraction of the dilution. While, therefore, between 0.000,001 and 0.000,1 mg./ml. of silver ion appears to be free, in a 10 percent solution of mild silver protein, at any one time, there is a reservoir of further, detachable ions amounting to many times that figure.

What proportion of the free and detachable silver ions may become combined with EDTA, following addition of 1 percent of monocalcium disodium EDTA to the solution, may be beyond determination because of its minuteness. The likelihood is that it may be less than 0.000,03 mg./ml., because the pull toward the protein so far exceeds the pull toward EDTA as to render unlikely any substantial drift of silver ions from the protein to the EDTA, and because the measured silver ion concentration immediately following EDTA addition, in the quantity proposed, remains substantially unchanged.

It will thus be seen that it is possible to stabilize silver protein to an extent permitting its distribution in the form of a ready-for-use solution, by the manufacturer, without the necessity for the customary intervening evaporation to "crystal" form and re-solution by the pharmacist. In the case of ophthalmic preparation, for example, it is highly desirable to have at hand those that are reliably sterile. Since silver protein, especially the "mild" type, is well-known and widely used for ophthalmic purposes, it may now be made and distributed in solution form that is dependably sterile when instilled in an eye. This is true also when topically applied to mucous membranes, such as in the nose, throat, urinary tract, etc. The invention, moreover, provides a greatly improved and a far more economical process for manufacturing silver protein, because of the elimination of intermediate evaporation to dryness by the manufacturer, the collection, processing and packaging of the dried product, and the re-dissolving of the dried product in water before final packaging and issue by the pharmacist.

It will be clear also to those skilled in this art that the above examples are by way of illustration, and that the practice of the invention lends itself readily to a number of useful modifications, both as to method and product.

We claim:

1. Silver protein for therapeutic use having incorporated therein a non-toxic chelating agent selected from the group consisting of ethylene diamine tetraacetic acid and its sodium and mixed sodium and calcium salts in an amount effective to maintain a predetermined ionic silver concentration of an aqueous solution of the silver protein.

2. Silver protein according to claim 1, in which the chelating agent is ethylene diamine tetraacetic acid.

3. Silver protein according to claim 1, in which the chelating agent is tetrasodium ethylene diamine tetraacetate.

4. Silver protein according to claim 1, in which the chelating agent is monocalcium disodium ethylene diamine tetraacetate.

5. An aqueous solution of silver protein for therapeutic use having incorporated therein a non-toxic chelating agent selected from the group consisting of ethylene diamine tetraacetic acid and its sodium and mixed sodium and calcium salts in an amount effective to maintain a predetermined ionic silver concentration.

6. A silver protein suspension according to claim 5, in which the chelating agent is ethylene diamine tetraacetic acid.

7. A silver protein suspension according to claim 5, in which the chelating agent is tetrasodium ethylene diamine tetraacetate.

8. A silver protein suspension according to claim 5, in which the chelating agent is monocalcium disodium ethylene diamine tetraacetate.

References Cited in the file of this patent

UNITED STATES PATENTS 1,582,940    Taub _____ May 4, 1926

OTHER REFERENCES

"Versene, the Modern Chelating Agent," Tech. Bull. No. 1 (Bersworth Chem. Co.), pp. 1–3 (1949).

Sutermeister et al.: "Casein and Its Industrial Applications," ACS Moograph No. 30, 2nd ed., pp. 381–2 (1939).